A. FELLDIN.
Distance-Measuring Device.
No. 210,931. Patented Dec. 17, 1878.
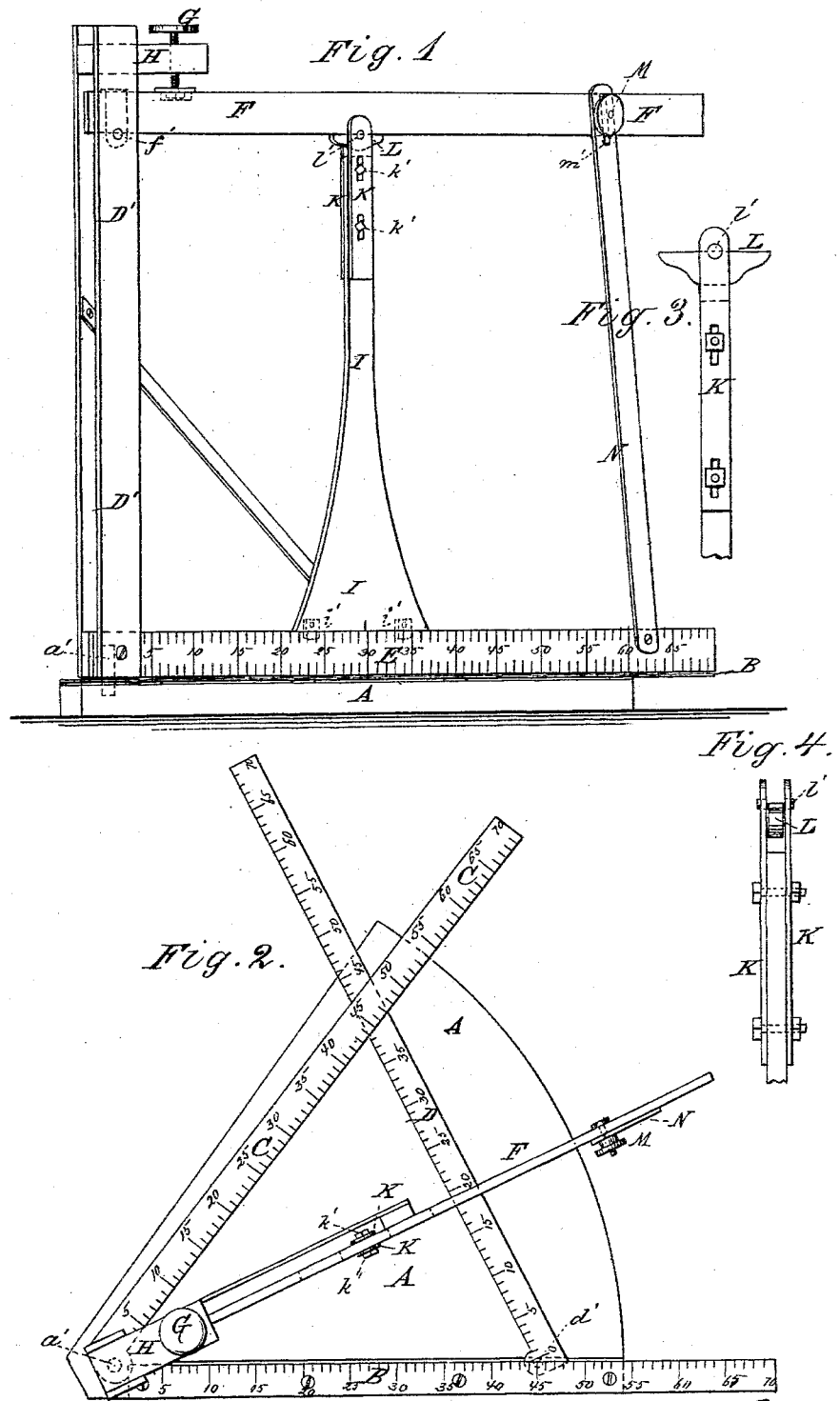
Witnesses:
H. Rydquist
Fr. Weber
Inventor:
Abraham Felldin

UNITED STATES PATENT OFFICE.

ABRAHAM FELLDIN, OF BROOKLYN, NEW YORK.

IMPROVEMENT IN DISTANCE-MEASURING DEVICES.

Specification forming part of Letters Patent No. 210,931, dated December 17, 1878; application filed July 18, 1878.

*To all whom it may concern:*

Be it known that I, ABRAHAM FELLDIN, of Brooklyn, in the county of Kings and State of New York, have invented a new and Improved Distance-Measurer, of which the following is a specification:

The object of my invention is to provide an instrument, simple in construction and convenient in use, for measuring distances between objects without the use of a chain, tape-line, or their equivalents.

In the accompanying drawing, Figure 1 represents a side elevation, and Fig. 2 a top view, of my improved distance-measurer. Fig. 3 is a side view, and Fig. 4 a front view, of the upper part of the indicator.

Similar letters of reference indicate corresponding parts.

A is a horizontal disk, having in its center the vertical tap $a'$. B is a scale fastened to the disk A. C is a movable scale swinging around the tap $a'$, the point of the angle formed by the inner sides of both scales always being in the center of the tap $a'$. D is a sliding scale, having a pin, $d'$, at one end, which runs in a slot cut into the disk A in a way so that the center of the pin always lies in the line of the inner side of the scale B. $D'$ is an upright, swinging on the tap, $a'$, and having at its lower end the scale E, fastened to it by means of screws and a brace, or made in one piece with same, the angle between the center line of the upright $D'$ and the upper side of the scale E to be a true right angle.

In the upper part of the upright $D'$ is a top bar, F, resting on the axle $f'$, and adjustable to different inclinations by means of the screw G, running through the top block H. This screw has at its lower end a nut, which works in a notch cut into the upper edge of said top bar, the center of the axle $f'$ to lie in a line with the under side of the top bar F.

M is a set-screw, running through the top bar F and the slot $m'$, cut into the brace N, which brace is fastened at its other end to the scale E, the object of this brace being to hold the top bar F in a firm position while reading off the distance from the scale E.

I is an indicator, the lower end of which rests on the upper side of the scale E, and is kept in place by the guides $i'$ $i'$. K K are guides, fastened to the upper end of the indicator by means of the screws $k'$ $k'$, and adjustable (for purpose of changing or correcting the scale) to different higher or lower positions by means of slots, through which the screws run. L is a balancing-block, resting on the axle $l'$, which rests with its ends in the guides K K, the upper half of the part of the axle lying between the guides K K being filed off, so as to cause the center of the axle to lie in the line of the upper surface of the balancing-block. In a full-sized instrument the disk A has to rest on a tripod, and is to be adjusted to a horizontal position by screws.

To find the distance from the place of observation to a certain object, adjust the disk A to a horizontal position; turn the upright $D'$ so that the scale E points to the object to which the distance is wanted to be known; aim along the upper side of said scale E, and observe in what point the line of sight strikes the object; loosen the set-screw M; now aim along the under side of the top bar F, adjusting the same by turning the screw G until the line of sight strikes the same point—*i. e.*, the point of the angle between the two lines of sight meets the object; fasten the set-screw M; insert between the top bar F and scale E the indicator I, and move it forward until it rests firmly between both. The mark at the lower edge of the indicator (being in the center line of the indicator and right under the center of the axle $l'$) will show on the scale E the distance between the point of observation and the object.

To find the interval between two objects, both being a distance from the point of observation, measure the distance from the place where the instrument stands to one of the objects, as above described; turn the upright and measure the distance to the other object in a similar way; then bring over the scale C so that the inner edge of same comes right under the scale E. Suppose the first distance to have been forty yards, the other fifty-two yards; bring up the sliding scale D so that the inner side of said scale lies from the mark 40 on the scale B to the mark 52 on the inner side of the scale C. The mark on the scale D which then comes at the point of intersection between the inner sides of the scales C and D indicates the number of yards between the objects.

It will be understood that by fixing the disk A in a vertical instead of horizontal position, the height of an object may be obtained by a similar operation to that above mentioned.

Having thus described my invention, what I claim as new, and desire to secure by Letters Patent, is—

1. The upright D', swinging on the tap $a'$, and carrying the bottom scale E and top bar F, adjustable by the screw G, running through the top block H, substantially as and for the purpose set forth.

2. The indicator I, carrying the balancing-block L, resting on the axle $l'$, as described, and for the purpose specified and set forth.

3. The disk A, having the scales B, C, and D, in combination with the upright D' (carrying the fixed scale E and adjustable top bar F) and indicator I, substantially as described, and for the purpose specified and set forth.

ABRAHAM FELLDIN.

Witnesses:
H. RYDQUIST,
FREDK. WEBER.